United States Patent
Young et al.

(10) Patent No.: US 9,551,300 B2
(45) Date of Patent: Jan. 24, 2017

(54) VEHICLE TEMPERATURE REGULATION SYSTEM AND METHOD

(71) Applicant: General Electric Company, Schenectady, NY (US)

(72) Inventors: Henry Todd Young, Erie, PA (US); Timothy Brown, Erie, PA (US); Ord Allen Randolph, Erie, PA (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 14/464,306

(22) Filed: Aug. 20, 2014

(65) Prior Publication Data
US 2015/0053173 A1    Feb. 26, 2015

Related U.S. Application Data

(60) Provisional application No. 61/867,864, filed on Aug. 20, 2013.

(51) Int. Cl.
| | |
|---|---|
| F02M 3/06 | (2006.01) |
| B60W 20/00 | (2016.01) |
| F02D 41/06 | (2006.01) |
| B60K 6/46 | (2007.10) |
| F02B 3/06 | (2006.01) |

(52) U.S. Cl.
CPC F02M 3/06 (2013.01); B60K 6/46 (2013.01); B60W 20/00 (2013.01); F02D 41/06 (2013.01); *B60L 2210/40* (2013.01); *B60W 2510/0676* (2013.01); *B60W 2510/087* (2013.01); *F02B 3/06* (2013.01); *F02D 2200/021* (2013.01); *F02D 2200/0414* (2013.01); *F02D 2250/24* (2013.01); *Y02T 10/6217* (2013.01)

(58) Field of Classification Search
CPC ............ F02M 3/06; B60K 6/46; B60W 20/00; B60W 2510/087; B60W 2510/0676; F02D 41/06; F02D 2250/24; F02D 2200/0414; F02D 2200/021; Y02T 10/6217; B60L 2210/40; F02B 3/06
USPC .......... 701/22, 104, 102, 103; 903/930, 902, 903/906, 903, 905; 180/65.265, 65.285, 65.245, 180/65.21, 65.23
See application file for complete search history.

(56) References Cited

U.S. PATENT DOCUMENTS

| | | | | |
|---|---|---|---|---|
| 5,255,733 | A | * | 10/1993 | King ...................... B60H 1/004 123/142.5 R |
| 5,923,135 | A | | 7/1999 | Takeda |

(Continued)

FOREIGN PATENT DOCUMENTS

KR    1020130087072 A    8/2013

OTHER PUBLICATIONS

International Search Report and Written Opinion issued in connection with corresponding PCT Application No. PCT/US2014/051819 dated Dec. 12, 2014.

*Primary Examiner* — Joseph Dallo
(74) *Attorney, Agent, or Firm* — John A. Kramer; Global Patent Operation

(57) ABSTRACT

A temperature regulation system for a vehicle includes a drive system configured to be coupled to an engine of the vehicle. The drive system is configured to convert power produced by the engine into electrical power for use by at least one traction motor of the vehicle. The system further includes a control unit for controlling the engine and drive system. The control unit is configured to automatically regulate a temperature of a vehicle component in dependence upon a detected reference temperature.

17 Claims, 4 Drawing Sheets

(56) References Cited

U.S. PATENT DOCUMENTS

| | | | | |
|---|---|---|---|---|
| 6,026,921 | A * | 2/2000 | Aoyama | B60K 6/48 123/348 |
| 6,057,605 | A * | 5/2000 | Bourne | B60K 6/485 290/40 A |
| 6,059,057 | A * | 5/2000 | Yamazaki | B60K 6/445 180/309 |
| 6,195,985 | B1 * | 3/2001 | del Re | B60K 6/46 123/DIG. 11 |
| 6,278,915 | B1 * | 8/2001 | Deguchi | B60K 6/543 180/65.235 |
| 6,301,529 | B1 * | 10/2001 | Itoyama | B60K 6/485 180/65.26 |
| 6,305,347 | B1 * | 10/2001 | Russell | F02D 41/1497 123/295 |
| 6,327,852 | B1 * | 12/2001 | Hirose | B60K 6/445 180/65.235 |
| 6,330,498 | B2 * | 12/2001 | Tamagawa | 180/65.26 |
| 6,367,570 | B1 * | 4/2002 | Long, III | B60K 6/485 180/65.26 |
| 6,657,315 | B1 * | 12/2003 | Peters | B60K 6/485 180/65.26 |
| 6,769,400 | B1 * | 8/2004 | Ament | B60K 6/48 123/399 |
| 7,007,460 | B2 * | 3/2006 | Frieden | F01N 3/2006 60/274 |
| 7,040,269 | B2 * | 5/2006 | Dehrmann | B60L 11/02 123/142.5 R |
| 7,121,084 | B2 * | 10/2006 | Miyashita | B60K 6/48 180/65.25 |
| 7,182,065 | B2 * | 2/2007 | Andersen | B60K 6/365 123/352 |
| 7,240,481 | B2 * | 7/2007 | Ament | F02D 29/06 123/339.18 |
| 7,316,108 | B2 * | 1/2008 | Pott | F01N 13/009 60/286 |
| 7,778,767 | B2 * | 8/2010 | Santoso | F02D 41/0087 123/179.16 |
| 7,832,198 | B2 * | 11/2010 | Okubo | B60W 10/06 123/568.21 |
| 8,332,091 | B2 * | 12/2012 | Zeh | B60K 6/46 123/295 |
| 8,596,391 | B2 * | 12/2013 | Kshatriya | B60K 1/00 180/65.1 |
| 2005/0258807 | A1 | 11/2005 | Yanagi | |
| 2006/0001318 | A1 * | 1/2006 | Ahmad | B60L 1/003 307/10.1 |
| 2006/0207809 | A1 * | 9/2006 | Casey | B60K 6/46 180/65.1 |
| 2007/0062745 | A1 * | 3/2007 | Gebert | B60K 6/48 180/65.245 |
| 2007/0215105 | A1 * | 9/2007 | Miura | F01L 13/0026 123/339.19 |
| 2008/0078166 | A1 * | 4/2008 | Rose | B60K 6/46 60/284 |
| 2010/0025131 | A1 * | 2/2010 | Gloceri | B60G 3/20 180/65.28 |
| 2011/0174244 | A1 * | 7/2011 | Maki | F01P 5/12 123/41.1 |
| 2011/0253113 | A1 | 10/2011 | Roth et al. | |
| 2012/0004825 | A1 * | 1/2012 | Koch | F01N 3/2066 701/103 |
| 2012/0004833 | A1 * | 1/2012 | Koch | F02D 41/024 701/104 |
| 2013/0108476 | A1 | 5/2013 | Guzelgunler | |

* cited by examiner

VEHICLE TEMPERATURE REGULATION SYSTEM AND METHOD

CROSS-REFERENCE TO RELATED APPLICATION

This application claims priority to U.S. Provisional Application No. 61/867,864, filed Aug. 20, 2013, which is hereby incorporated by reference.

FIELD OF THE INVENTION

Embodiments of the invention relate generally to temperature regulation systems. Other embodiments relate to temperature regulation systems for a vehicle engine and drive system.

BACKGROUND OF THE INVENTION

Large off-highway vehicles ("OHVs"), such as mining vehicles used to haul heavy payloads excavated from open pit mines, are well known and typically employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high torque low speed rotational energy output which is supplied to the rear wheels.

Typical operating loads in an OHV may exceed one hundred tons, while the gross weight of the vehicle and load may be several hundred tons. Besides hauling heavy loads, OHVs frequently operate in remote locations with extreme climatic conditions where temperatures may go as low as −30° C. to −60° C. At such extreme cold temperatures, when the OHV is parked or in an idle state, the engine may not generate enough heat on its own to maintain its operating temperature within ranges necessary for sufficient performance. In addition, drive system components may be damaged or exhibit performance degradation in such extreme cold.

Accordingly, it may be desirable to provide a system and method for regulating the temperature of the engine and/or drive system components of OHVs and other mining equipment in conditions of extreme cold.

BRIEF DESCRIPTION OF THE INVENTION

An embodiment of the present invention relates to a temperature regulation system for a vehicle. The system includes a drive system configured to be coupled to an engine of the vehicle. The drive system is configured to convert power produced by the engine into electrical power for use by at least one traction motor of the vehicle. The system further includes a control unit for controlling the engine and drive system. The control unit is configured to automatically regulate a temperature of a vehicle component in dependence upon a detected reference temperature.

In another embodiment of a temperature regulation system for a vehicle, the system comprises a drive system configured to be coupled to an engine of the vehicle. The drive system includes one or more power converters having one or more power semiconductor switches, to convert power produced by the engine into electrical power for use by at least one traction motor of the vehicle. The system further comprises a control unit for controlling the engine and drive system. In an embodiment, the control unit is configured to automatically regulate a temperature of the power semiconductor switches by firing the power semiconductor switches in a manner that does not cause the at least one traction motor to move the vehicle.

In another embodiment, a method for temperature regulation of a vehicle comprises determining a reference temperature associated with an engine of the vehicle; comparing, by a control unit of the vehicle, the reference temperature with a predetermined minimum operating temperature of the engine; and automatically applying, by the control unit, additional load to the engine, above an idle level of the engine, if the reference temperature is below the minimum operating temperature.

In another embodiment, a method for regulating the temperature of a vehicle or other power generating device comprises determining a reference temperature associated with a drive system component of the vehicle or other device; comparing, by a control unit of the vehicle or other device, the reference temperature with a predetermined minimum operating temperature associated with the drive system component; and automatically actuating, by the control unit, the drive system component to increase an operating temperature of the component if the reference temperature is below the minimum operating temperature.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
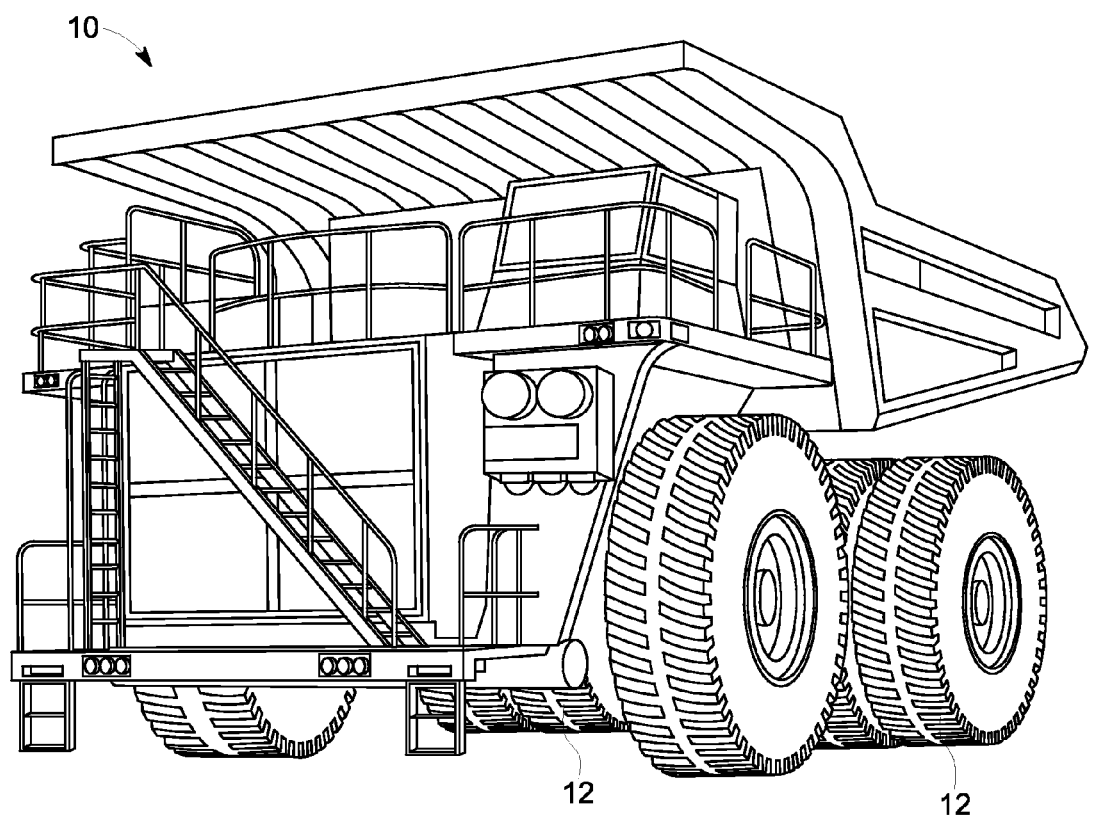
FIG. 1 is a perspective view of a haul truck according to an embodiment of the invention.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to haul trucks having a diesel engine that are utilized in the surface mining industry, embodiments of the invention are also applicable for use with internal combustion engines and vehicles employing such engines, generally. For example, the vehicles may be off-highway vehicles ("OHVs") designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, etc. As used herein, "electrical communication" or "electrically coupled" means that certain components are configured to communicate with one another through direct or indirect signaling by way of direct or indirect electrical connections. As used herein, "reference temperature" means the temperature seen by the engine or drive system components of the vehicle. "Reference temperature" may be ambient temperature, the temperature within the engine, or the temperature of one of the drive system components.

FIG. 1 illustrates a haul truck 10, in which the temperature regulation system of the present invention may be incorporated. The haul truck 10 is a dump truck specifically engineered for use in high production mining and heavy-duty construction environments, and includes drive wheels 12 coupled to a diesel-electric power/drive system 100 which provides motive power to the haul truck 10. (The haul truck 10 is illustrative of vehicles generally, although in embodiments, a system and/or method of the invention is implemented on a haul truck specifically.)

Figure 2:
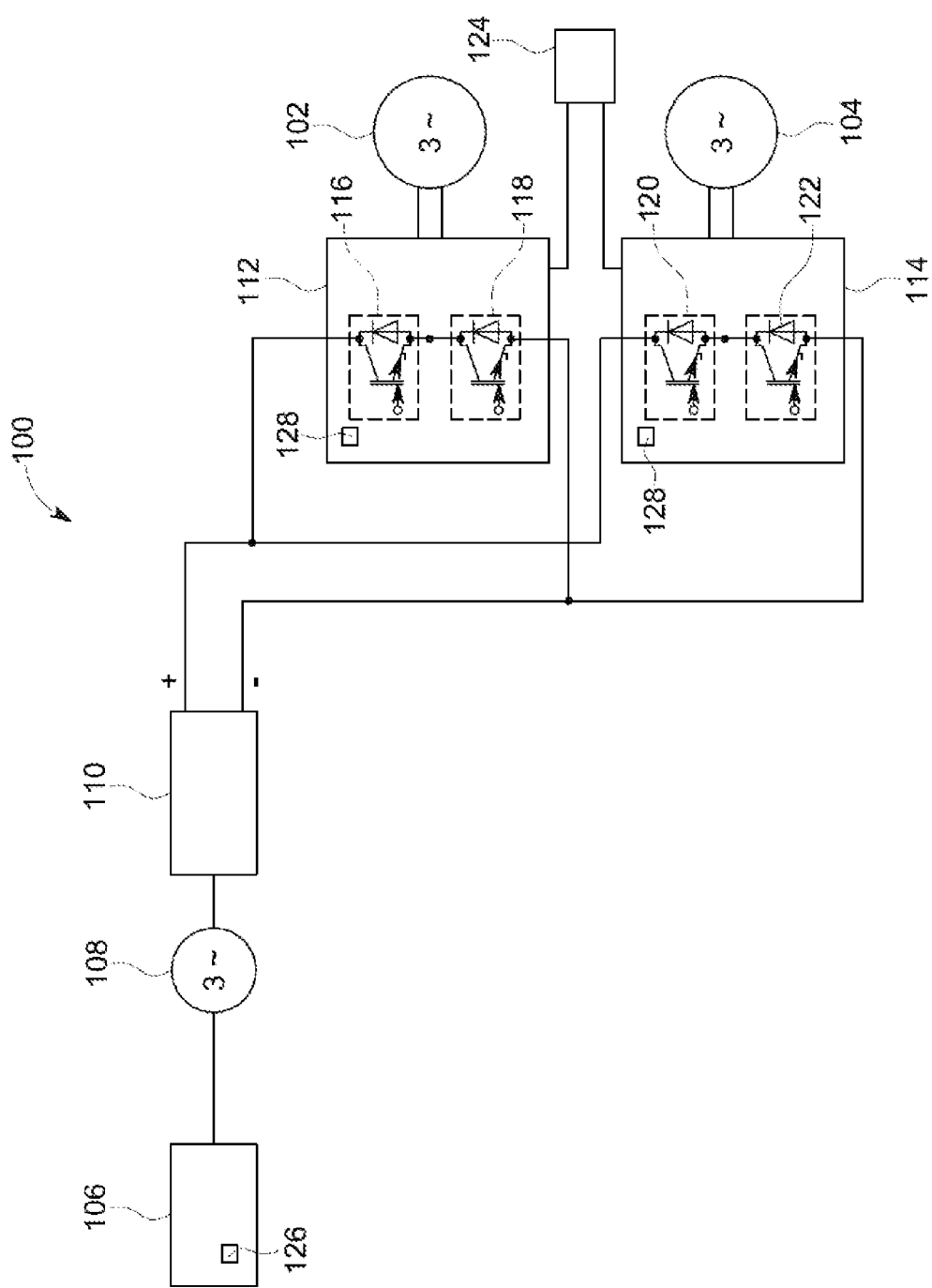
FIG. 2 is a schematic diagram of a power/traction system of the haul truck of FIG. 1.

With reference to FIG. 2, the power/drive system 100 is shown. As indicated above, the haul truck has at least two drive wheels 12. Each wheel 12 is driven by a three-phase alternating-current (AC), induction type wheel motor. The wheel motors are referenced as a first wheel motor 102 and a second wheel motor 104. Electrical power is supplied by a diesel engine 106 driving a three-phase AC generator 108. In other embodiments, other types of mechanical/fuel engines may be utilized. The diesel engine 106 and generator 108 are housed within the haul truck 10. The AC output of the generator 108 is fed into one or more rectifiers 110 (e.g., a three-phase diode array), which delivers voltage Vdc. The direct current (DC) output of the rectifiers 110 is fed into a set of power converters 112, 114. The power converters include switch modules 116, 118, 120, 122, comprising one or more power semiconductor switches, which together commutate Vdc to deliver three-phase AC electrical power to traction motors 102, 104. (Traction motors are electric motors configured for use in moving a vehicle.)

It will be appreciated that the invention is not limited by the particular arrangement of the switch modules 111, 112, etc. to form a power converter 110. Rather, the present invention is equally applicable in other embodiments (not shown), including, for example, a single switch module or an array of switch modules used for electrical power conversion.

Although FIG. 2 specifically illustrates an exemplary embodiment wherein the power semiconductor switch is an insulated gate bipolar transistor (IGBT), the present invention may also be applicable to other voltage-controlled or other semiconductor devices, including, by way of non-limiting examples, bi-mode isolated gate transistors, reverse-conducting IGBTs, MOSFETs and JFETs.

With further reference to FIG. 2, a control unit 124 is electrically coupled to the power converters 112, 114 (and to the switch modules 116, 118, 120, 122 thereof). As is known in the art, the control unit 124 determines and sends a desired torque request signal to the inverters 112, 114. The torque request signal is processed by the controller for the inverters 112, 114 to drive the motors 102, 104 to the desired torque output magnitude, and in the desired rotational direction corresponding to the intended direction of vehicle movement. The control unit 124 includes one or more microprocessors operating according to a set of stored instructions to provide for vehicle control and automatic temperature regulation of vehicle components, as discussed in detail hereinafter.

As discussed above, during periods of extreme cold, when the vehicle 10 is parked or in an idle situation, the engine 106 may not be able to generate enough heat on its own, even at an elevated idle, to maintain its operating temperature within preferred ranges. As a result, engine damage, slow response, and reduction in fuel burning efficiency is possible. In addition, during periods of extreme cold, the components of the drive system 100, such as the IGBT switch modules 116, 118, 120, 122 may be damaged by temperatures below approximately −40° C.

In connection with the above, therefore, the control unit 124 is configured to monitor a reference temperature, e.g., one or more of engine temperature utilizing sensor 126 positioned within or adjacent to the engine 106, ambient temperature utilizing an ambient temperature sensor (not shown), and power converter temperature utilizing a sensor 128 configured for coupling adjacent to or within the power converters 112, 114. In an embodiment, the temperature sensors are electrically coupled to the control unit 124 and are configured to automatically relay signals representative of the detected temperature(s) to the control unit at predetermined time intervals. In other embodiments, the temperature sensors are configured to relay signals representative of the detected temperatures(s) continuously. In yet other embodiments, the control unit 124 may communicate with the temperature sensors wirelessly.

In an embodiment, in order to maintain the operating temperature of the engine 106 within a predetermined, optimal range, the control unit 124 is configured to automatically utilize the drive system 100 to apply additional load to the engine 106 when one or more of the detected temperatures reaches a predetermined low value. In an embodiment, the additional load is a load upon the engine above an idle level of the engine. As will be readily appreciated, by applying additional load to the engine 106, the operating temperature thereof may be increased and automatically maintained above a predetermined value. In connection with this, the control unit 124 utilizes the drive system 100 to monitor engine parameters while loading the engine 106, thus taking the operator out of the loop and optimizing fuel burn.

The control unit 124 is also configured to maintain the operating temperature of the drive system components and, in particular, the IGBTs or other power semiconductor switches 116, 118, 120, 122, within a preferred range. In particular, when one or more of the detected temperatures reaches a predetermined lower threshold, the control unit 124 is configured to keep the IGBTs 116, 118, 120, 122 warm by firing them in a DC sequence which does not rotate the AC traction motors 102, 104. By automating the firing of the IGBTs in a DC sequence in dependence upon drive system parameters, e.g., the sensed temperature of the power converters 112, 114, the drive system components may be maintained within preferred operating ranges without requiring operator input or action.

Figure 3:
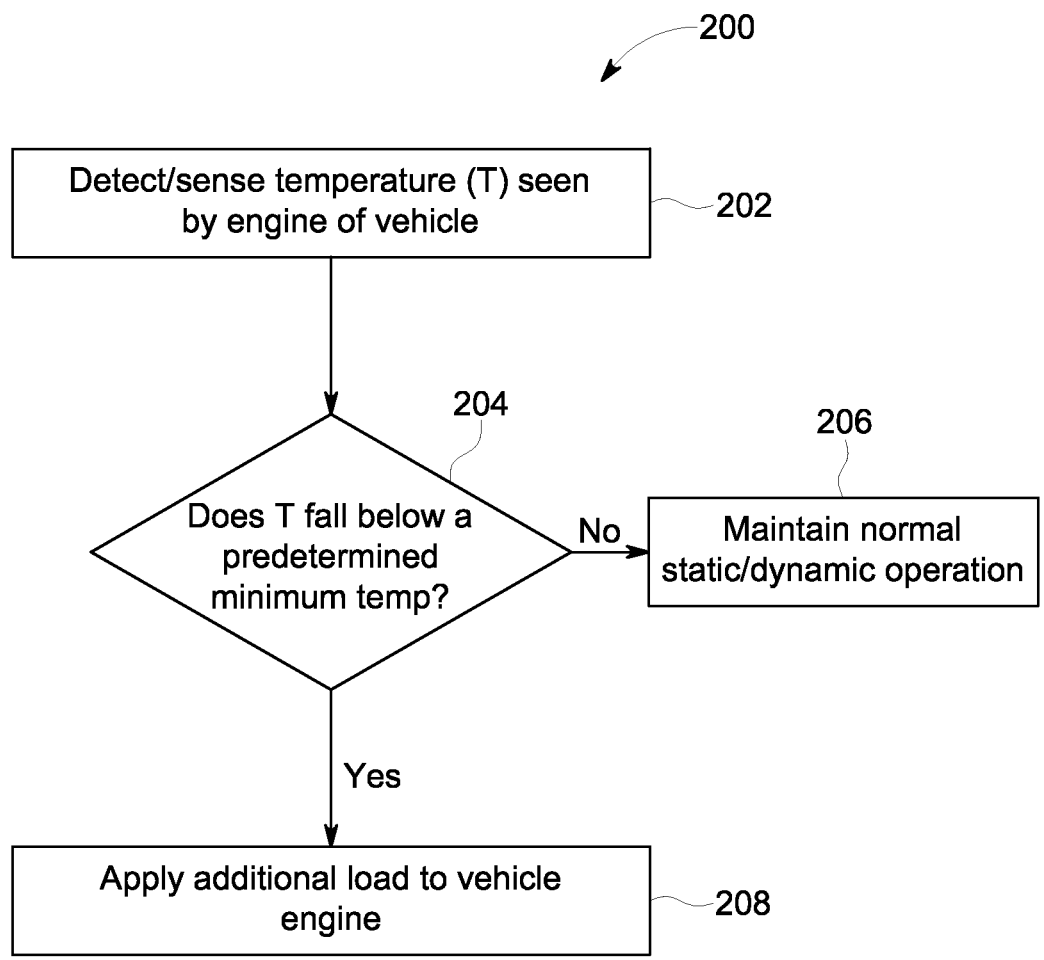
FIG. 3 is a flowchart illustrating a method for regulating the temperature of the engine of a vehicle, according to an embodiment of the invention.

Turning now to FIG. 3, a method 200 of regulating the temperature of a vehicle is provided. The method 200 includes, at step 202, determining the temperature seen by the engine 106 of the vehicle 10. The temperature may be the temperature of ambient air or the temperature within the engine 106. As step 204, the control unit 124 checks to see if the detected/sensed temperature falls below a predetermined minimum temperature. If the temperature does not, at step 206, no action regarding the regulation of engine temperature is undertaken. If the detected temperature does fall below the minimum permissible temperature value stored in memory, then additional load is applied to the engine, at step 208, to warm the engine to within a preferred operating range.

Figure 4:
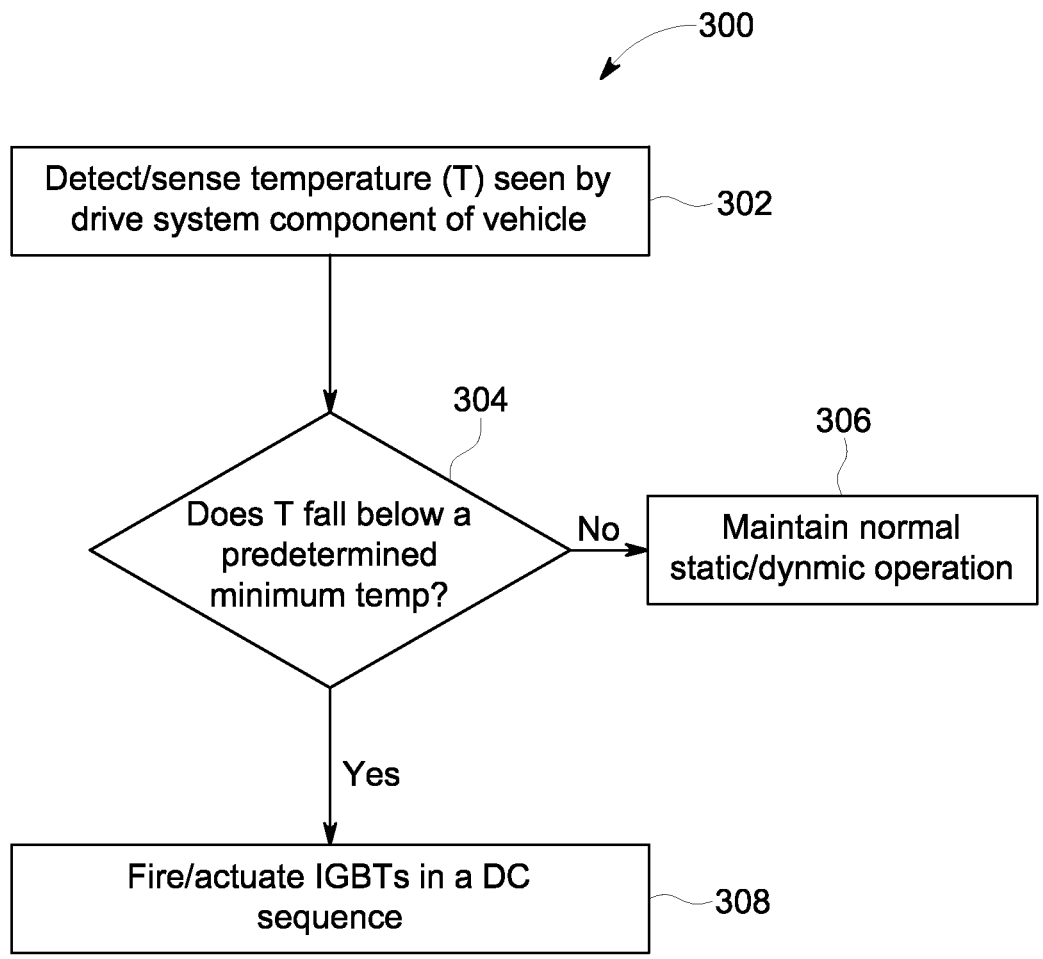
FIG. 4 is a flowchart illustrating a method for regulating the temperature of the drive system of a vehicle, according to an embodiment of the invention.

With reference to FIG. 4, similarly, a method 300 of regulating the temperature of a vehicle (e.g., the drive system 100 thereof) or power generating device, is provided. The method 300 includes, at step 302, determining a temperature seen by one of the drive system components of the vehicle or other device. The temperature may be the temperature of ambient air, the temperature adjacent to one of the power converters 112, 114, and/or the temperature of the engine 106, as hereinbefore disclosed. At step 304, the control unit 124 checks to see if the detected/sensed temperature falls below a predetermined minimum temperature. If the temperature does not, at step 306, no action regarding the regulation of the drive system 100 temperature is undertaken. If the detected temperature does fall below the minimum permissible temperature value stored in memory, then the control unit 124 controls the power semiconductor switches (e.g., IGBTs 116, 118, 120, 122 to fire in a DC sequence), at step 208, to warm the drive system (e.g., including the IGBTS) to within a preferred operating range.

As will be readily appreciated, therefore, the vehicle temperature regulation system of the present invention automatically maintains the engine at its optimum operating temperature during periods of inactivity, while at the same time optimizing fuel burn. In addition, the temperature regulation system avoids damage to the engine and drive system components in extreme cold temperatures. In contrast to existing systems, the temperature regulation system of the present invention is configured to automatically maintain engine and drive system temperature above a predetermined lower threshold, thereby obviating the need for operator input. As a result, the temperature regulation system may be operated in both static and dynamic conditions.

An embodiment relates to a system, e.g., a temperature regulation system for a vehicle. The system comprises a drive system configured to be coupled to an engine of the vehicle. The drive system is configured to convert power produced by the engine into electrical power for use by at least one traction motor of the vehicle. The system further comprises a control unit for controlling the engine and drive system. The control unit is configured to automatically regulate a temperature of a vehicle component in dependence upon a detected reference temperature.

Another embodiment relates to a system, e.g., a temperature regulation system for a vehicle. The system comprises a drive system configured to be coupled to an engine of the vehicle. The drive system is configured to convert power produced by the engine into electrical power for use by at least one traction motor of the vehicle. The system further comprises a control unit for controlling the engine and drive system. The control unit is configured to automatically regulate a temperature of the engine in dependence upon a detected reference temperature. For doing so, the control unit is configured to automatically control the drive system to apply additional load to the engine when the detected reference temperature is below a predetermined value. The additional load is a load upon the engine above an idle level of the engine. The system may further comprise a temperature sensor associated with the engine and electrically coupled to the control unit. The temperature sensor is configured to sense the detected reference temperature.

Another embodiment relates to a system, e.g., a temperature regulation system for a vehicle. The system comprises a drive system configured to be coupled to an engine of the vehicle. The drive system is configured to convert power produced by the engine into electrical power for use by at least one traction motor of the vehicle. The system further comprises a control unit for controlling the engine and drive system. The control unit is configured to automatically regulate a temperature of the engine in dependence upon a detected reference temperature. For doing so, the control unit is configured to automatically control the drive system to apply additional load to the engine when the detected reference temperature is below a predetermined value. The additional load is a load upon the engine above an idle level of the engine. The control unit is further configured to monitor engine parameters while applying the additional load to the engine, so as to avoid burning more fuel than is needed while applying the additional load for the temperature of the engine to be above a designated level.

Another embodiment relates to a system, e.g., a temperature regulation system for a vehicle. The system comprises a drive system configured to be coupled to an engine of the vehicle. The drive system includes one or more power converters having one or more power semiconductor switches (e.g., diodes, FET's, IGBT's, BJT's, other transistors), to convert power produced by the engine into electrical power for use by at least one traction motor of the vehicle. The system further comprises a control unit for controlling the engine and drive system. In an embodiment, the control unit is configured to automatically regulate a temperature of the power semiconductor switches by firing the power semiconductor switches in a manner that does not cause the at least one traction motor to move the vehicle. (For example, if a particular AC waveform or sequence is required to power the traction motor to move the vehicle, then the power semiconductor switches may be fired to produce a DC waveform (i.e., fired in a DC sequence), or to produce an AC waveform that differs from the particular AC waveform, e.g., an AC waveform at too low a magnitude of voltage and/or current to cause the motor to overcome vehicle inertia.) In another embodiment, the control unit is configured to automatically regulate the temperature of the power semiconductor switches (by firing the power semiconductor switches in a manner that does not cause the at least one traction motor to move the vehicle), responsive to a detected reference temperature (e.g., an ambient temperature, or a temperature within the vehicle) being below a predetermined value.

An embodiment relates to a system, e.g., a temperature regulation system for a vehicle. The system comprises a drive system configured to be coupled to an engine of the vehicle. The drive system is configured to convert power produced by the engine into electrical power for use by at least one traction motor of the vehicle. The system further comprises a control unit for controlling the engine and drive system. The control unit is configured to automatically regulate a temperature of a vehicle component in dependence upon a detected reference temperature. The vehicle component comprises a plurality of power semiconductor switches of at least one power converter of the drive system of the vehicle. The at least one power converter is configured to provide the electrical power for use by the at least one traction motor of the vehicle. The electrical power comprises AC power produced by firing of the power semiconductor switches in an AC sequence. The control unit is configured, for regulating the temperature of the power semiconductor switches when the power converter is not being used to provide the electrical power to the at least one traction motor, to automatically fire the plurality power semiconductor switches in a DC sequence. As one example, the power semiconductor switches may be insulated gate bipolar transistors.

An embodiment relates to a system, e.g., a temperature regulation system for a vehicle. The system comprises a drive system configured to be coupled to an engine of the vehicle. The drive system is configured to convert power produced by the engine into electrical power for use by at least one traction motor of the vehicle. The system further comprises a control unit for controlling the engine and drive system. The control unit is configured to automatically regulate a temperature of a vehicle component in dependence upon a detected reference temperature. The control unit is configured to automatically control the drive system to apply additional load to the engine when the detected reference temperature is below a predetermined value. The additional load being a load upon the engine above an idle level of the engine. The vehicle component comprises a plurality of power semiconductor switches of at least one power converter of the drive system of the vehicle. The power converter is configured to provide the electrical power for use by the at least one traction motor of the vehicle. The electrical power comprises AC power produced by firing of the power semiconductor switches in an AC sequence. The control unit is configured, for regulating the temperature of the power semiconductor switches when the power converter is not being used to provide the electrical power to the at least one traction motor, to automatically fire the plurality power semiconductor switches in a DC sequence.

An embodiment relates to a mine haul truck. The mine haul truck comprises an engine, a drive system coupled to the engine, a control unit, and at least on traction motor. The drive system is configured to convert power produced by the engine into electrical power for use by the at least one traction motor of the vehicle. The control unit is configured to control the engine and the drive system, and to automatically regulate a temperature of a vehicle component in dependence upon a detected reference temperature. (The mine haul truck may be further configured as otherwise set forth herein.)

In another embodiment, a method for temperature regulation of a vehicle comprises determining a reference temperature associated with an engine of the vehicle, comparing, by a control unit of the vehicle, the reference temperature with a predetermined minimum operating temperature of the engine, and automatically applying, by the control unit, additional load to the engine, above an idle level of the engine, if (i.e., responsive to) the reference temperature is below the minimum operating temperature. The reference temperature may be ambient temperature, or a temperature within the engine.

In another embodiment of the method, the method further comprises monitoring engine parameters while applying the additional load to the engine, so as to avoid burning more fuel than is needed while applying the additional load for the temperature of the engine to be above a designated level.

In another embodiment of the method, the method further comprises regulating the temperature of insulated gate bipolar transistors of a power converter of the vehicle, when the power converter is not being used to provide electrical power to any traction motors of the vehicle, by firing the insulated gate bipolar transistors in a DC sequence.

In another embodiment of the method, the step of regulating the temperature of the insulated gate bipolar transistors is carried out when a sensed temperature is below a predetermined value, the sensed temperature being different than the reference temperature.

Another embodiment relates to a temperature regulation system for a power generating device. (Power generating device refers to a device that uses fuel to generate electricity for powering a load. Examples include locomotives, mine haul trucks, and other diesel-electric vehicles (and other fuel-electric and/or hybrid vehicles), stationary generators, and the like.) The system comprises a drive system configured to be coupled to an engine of the device. The drive system is configured to convert power produced by the engine into electrical power for use by a load. The system further comprises a control unit for controlling the engine and drive system. The control unit is configured to determine a reference temperature associated with a component of the drive system; compare the reference temperature with a predetermined minimum operating temperature associated with the drive system component; and automatically actuate the drive system component to increase an operating temperature of the component if the reference temperature is below the minimum operating temperature. The reference temperature may be ambient temperature, or a temperature within the device. The predetermined minimum operating temperature may be a predetermined minimum operating temperature of the component itself, or a predetermined minimum operating temperature of the environment in which the component operates.

In an embodiment, the drive system component of the power generating device comprises a plurality of power semiconductor switches of one or more power converters of the device. The one or more power converters are electrically connected to drive a load. The step of actuating the drive system component includes firing the power semiconductor switches in a manner that heats the power semiconductor switches without driving the load. For example, the control unit may be configured to fire the power semiconductor switches to an extent sufficient to maintain the power semiconductor switches above a lower temperature threshold. The lower temperature threshold may be the predetermined minimum operating temperature or another temperature. For example, if the predetermined minimum operating temperature is of the environment of the power semiconductor switches, then the power semiconductor switches may be fired to maintain the power semiconductor switches above the lower temperature threshold which is different than (e.g., higher than) the predetermined minimum operating temperature.

In another embodiment, a method for regulating the temperature of a power generating device comprises determining a reference temperature associated with a drive system component of the device; comparing, by a control unit of the device, the reference temperature with a predetermined minimum operating temperature associated with the drive system component; and automatically actuating, by the control unit, the drive system component to increase an operating temperature of the component if the reference temperature is below the minimum operating temperature. The reference temperature may be ambient temperature, or a temperature within the device. The predetermined minimum operating temperature may be a predetermined minimum operating temperature of the component itself, or a predetermined minimum operating temperature of the environment in which the component operates.

In an embodiment, the drive system component of the power generating device comprises a plurality of power semiconductor switches of one or more power converters of the device. The one or more power converters are electrically connected to drive a load. The step of actuating the drive system component includes firing the power semiconductor switches in a manner that heats the power semiconductor switches without driving the load. For example, the power semiconductor switches may be fired to an extent sufficient to maintain the power semiconductor switches above a lower temperature threshold. The lower temperature threshold may be the predetermined minimum operating temperature or another temperature. For example, if the predetermined minimum operating temperature is of the environment of the power semiconductor switches, then the power semiconductor switches may be fired to maintain the power semiconductor switches above the lower temperature threshold which is different than (e.g., higher than) the predetermined minimum operating temperature.

Another embodiment relates to a method for regulating the temperature of a vehicle. The method comprises determining a reference temperature associated with a drive system component of the vehicle, comparing, by a control unit of the vehicle, the reference temperature with a predetermined minimum operating temperature of the drive system component, and automatically actuating, by the control unit, the drive system component to increase an operating temperature of the component if (i.e., responsive to) the reference temperature is below the minimum operating temperature. The reference temperature may be, for example, ambient temperature.

In another embodiment of the method, the drive system component comprises a plurality of power semiconductor switches of one or more power converters of the vehicle. The one or more power converters are electrically connected to drive one or more traction motors of the vehicle. The step of actuating the drive system component includes firing the power semiconductor switches in a manner that does not cause the one or more traction motors to move the vehicle.

In another embodiment of the method, the drive system component is a plurality of insulated gate bipolar transistors. The step of actuating the drive system component includes firing the insulated gate bipolar transistors in a DC sequence if the reference temperature is below the minimum operating temperature. The insulated gate bipolar transistors may be fired to an extent sufficient to maintain the insulated gate bipolar transistors above a lower temperature threshold.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. As used herein, the terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the vehicle temperature regulation system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A temperature regulation system for a vehicle, comprising:
 a drive system configured to be coupled to an engine of the vehicle, the drive system being configured to convert power produced by the engine into electrical power for use by at least one traction motor of the vehicle; and
 a control unit for controlling the engine and drive system, the control unit being configured to automatically regulate a temperature of a vehicle component in dependence upon a detected reference temperature;
 wherein the vehicle component comprises a plurality of power semiconductor switches of one or more power converters of the drive system of the vehicle, the one or more power converters electrically connected to provide the electrical power for use by the at least one traction motor of the vehicle; and
 the control unit is configured to automatically regulate the temperature of the power semiconductor switches, responsive to the detected reference temperature being below a predetermined value, by firing the power semiconductor switches in a manner that does not cause the at least one traction motor to move the vehicle to maintain the temperature of the power semiconductor switches within a desired operating range.

2. The system of claim 1, wherein the vehicle component is the engine, and the control unit is configured to automatically control the drive system to apply additional load to the engine, the additional load being a load upon the engine above an idle level of the engine, when the detected reference temperature is below a predetermined value.

3. The system of claim 2, further comprising:
 a temperature sensor associated with the engine and electrically coupled to the control unit, the temperature sensor being configured to sense the detected reference temperature.

4. The system of claim 2, wherein:
 the control unit is configured to monitor engine parameters while applying the additional load to the engine, so as to avoid burning more fuel than is needed while applying the additional load for the temperature of the engine to be above a designated level.

5. The system of claim 1, further comprising:
 at least one power converter being configured to provide the electrical power for use by the at least one traction motor of the vehicle, said electrical power comprising AC power produced by firing of the power semiconductor switches in an AC sequence; and the control unit is configured, for regulating the temperature of the power semiconductor switches when the power converter is not being used to provide the electrical power to the at least one traction motor, to automatically fire the plurality power semiconductor switches in a DC sequence.

6. The system of claim 5, wherein the power semiconductor switches are insulated gate bipolar transistors.

7. The system of claim 1, wherein:
the control unit is configured to automatically control the drive system to apply additional load to the engine, the additional load being a load upon the engine above an idle level of the engine, when the detected reference temperature is below a predetermined value;
the vehicle includes a power converter configured to provide the electrical power for use by the at least one traction motor of the vehicle, said electrical power comprising AC power produced by firing of the power semiconductor switches in an AC sequence; and
the control unit is configured, for regulating the temperature of the power semiconductor switches when the power converter is not being used to provide the electrical power to the at least one traction motor, to automatically fire the plurality power semiconductor switches in a DC sequence.

8. A method for temperature regulation of a vehicle, comprising:
determining a reference temperature associated with an engine of the vehicle;
comparing, by a control unit of the vehicle, the reference temperature with a predetermined minimum operating temperature of the engine;
automatically applying, by the control unit, additional load to the engine, above an idle level of the engine, if the reference temperature is below the minimum operating temperature; and
regulating the temperature of insulated gate bipolar transistors of a power converter of the vehicle, when the power converter is not being used to provide electrical power to any traction motors of the vehicle, by firing the insulated gate bipolar transistors in a DC sequence;
wherein the step of regulating the temperature of the insulated gate bipolar transistors is carried out when a sensed temperature is below a predetermined value, the sensed temperature being different than the reference temperature.

9. The method of claim 8, wherein:
the reference temperature is ambient temperature.

10. The method of claim 8, wherein:
the reference temperature is a temperature within the engine.

11. The method of claim 8, further comprising the step of:
monitoring engine parameters while applying the additional load to the engine, so as to avoid burning more fuel than is needed while applying the additional load for the temperature of the engine to be above a designated level.

12. A method for regulating the temperature of a power generating device, comprising:
determining a reference temperature associated with a drive system component of the device;
comparing, by a control unit of the device, the reference temperature with a predetermined minimum operating temperature associated with the drive system component; and
automatically actuating, by the control unit, the drive system component to increase an operating temperature of the component if the reference temperature is below the minimum operating temperature;
wherein the drive system component comprises a plurality of power semiconductor switches of one or more power converters of the device, the one or more power converters electrically connected to drive a load; and
wherein the step of actuating the drive system component includes firing the power semiconductor switches in a manner that heats the power semiconductor switches without driving the load.

13. The method of claim 12, wherein:
the reference temperature is ambient temperature.

14. The method of claim 12 wherein the power semiconductor switches are fired to an extent sufficient to maintain the power semiconductor switches above a lower temperature threshold.

15. The method of claim 12, wherein:
the device is a vehicle, and the load comprises one or more traction motors of the vehicle; and
the step of actuating the drive system component includes firing the power semiconductor switches in a manner that does not cause the one or more traction motors to move the vehicle.

16. The method of claim 12, wherein:
the drive system component is a plurality of insulated gate bipolar transistors; and
the step of actuating the drive system component includes firing the insulated gate bipolar transistors in a DC sequence if the reference temperature is below the minimum operating temperature.

17. The method of claim 16, wherein:
the insulated gate bipolar transistors are fired to an extent sufficient to maintain the insulated gate bipolar transistors above a lower temperature threshold.

* * * * *